United States Patent [19]

Krolikowski et al.

[11] 3,760,384

[45] Sept. 18, 1973

[54] FET MEMORY CHIP INCLUDING FET DEVICES THEREFOR AND FABRICATION METHOD

[75] Inventors: Walter F. Krolikowski, Hopewell Junction; Donald F. Lund, Hyde Park, both of N.Y.

[73] Assignee: Cogar Corporation, Wappingers Falls, N.Y.

[22] Filed: Oct. 27, 1970

[21] Appl. No.: 84,277

[52] U.S. Cl......... 340/173 R, 340/172.5, 317/235 A

[51] Int. Cl............................................... G11c 11/40

[58] Field of Search..................... 340/173 R, 172.5; 317/235

[56] References Cited

UNITED STATES PATENTS

| | | | |
|---|---|---|---|
| 3,440,502 | 4/1969 | Lin | 317/235 |
| 3,447,046 | 5/1969 | Cricchi | 317/235 |
| 3,387,286 | 6/1968 | Dennard | 340/173 |
| 3,533,089 | 10/1970 | Wahlstrom | 340/173 |
| 3,541,530 | 11/1970 | Spampinato | 340/173 |
| 3,576,571 | 4/1971 | Booher | 340/173 |

*Primary Examiner*—Terrell W. Fears
*Attorney*—Harry M. Weiss

[57] ABSTRACT

This disclosure is directed to a field effect transistor (FET) semiconductor chip which includes a number of FET memory cells or circuits connected together to form a memory system or array. Some FET devices used in the memory cells of the memory array and in other locations of the memory system contain "crooked" gates. A number of different gate geometries, dimensions, or size ratios are used for a variety of FET devices used in the memory array.

Various techniques are also disclosed for laying out a very dense FET memory array on a tiny semiconductor chip so as to preserve minimum spacing and dimension rules for metallized and diffused regions. Various structures and techniques are described to maximize memory cell density within minimum semiconductor real estate. Additional features include a varying number of alignment marks for the different levels of masks used in fabricating the FET memory chip. The FET fabrication process is also disclosed which permits the formation of a high speed N-channel FET memory array with devices that have high transconductance and other desired device parameters, features and characteristics to provide a reliable, high performance FET memory array system. The fabrication process includes the formation of a thin epitaxial layer prior to the diffusion of source and drain regions and the use of a double photoresist layer in one step of the process wherein a block-out mask pattern is provided in each of the two photoresist layers to minimize pinhole probelms and to permit precise alignment of the simultaneous etched out gate window and source and drain contact areas in the thick oxide located on the surface of the chip.

37 Claims, 20 Drawing Figures

FIG. I

INVENTORS
WALTER F. KROLIKOWSKI
DONALD F. LUND

BY Harry M Weiss
ATTORNEY

FIG. 9A
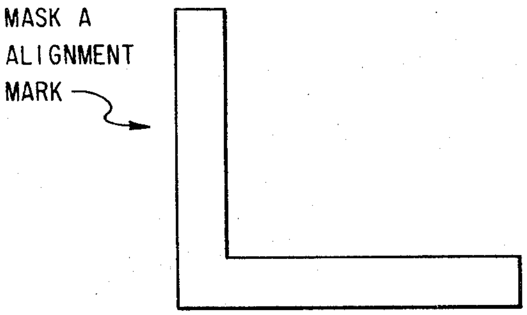
FIG. 9B
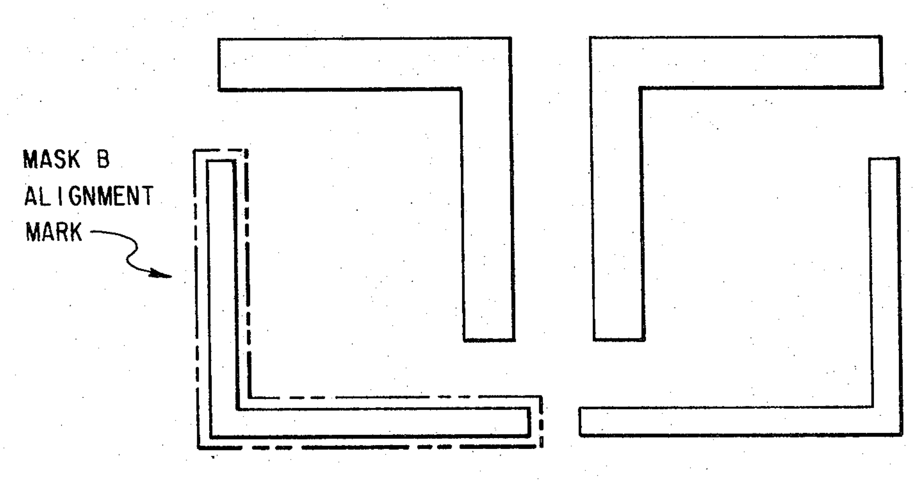
FIG. 9C1
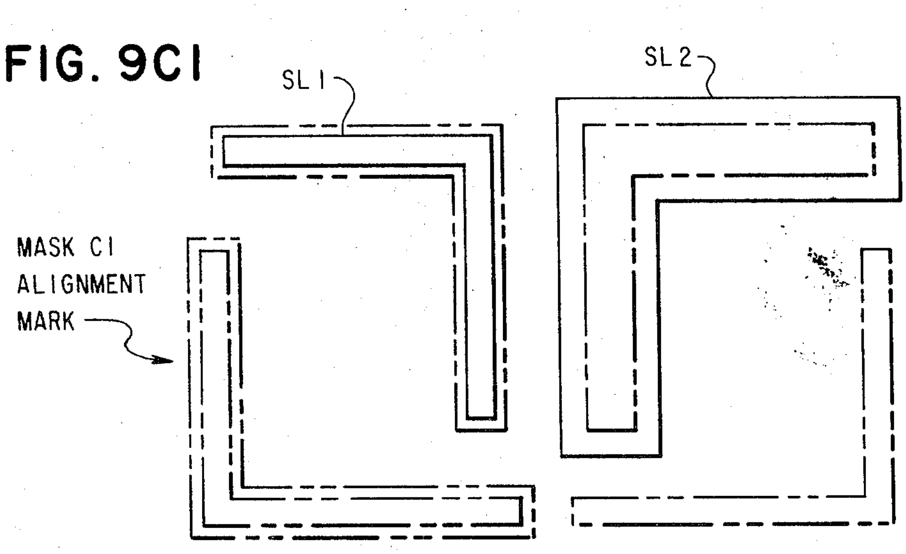

FIG. 9A'
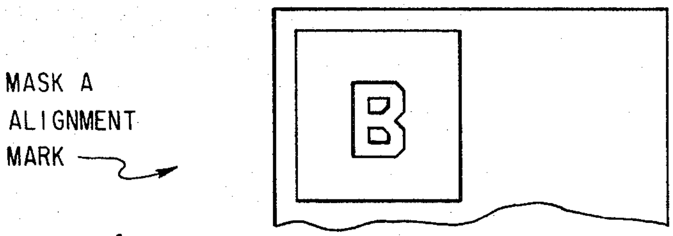
FIG. 9B'
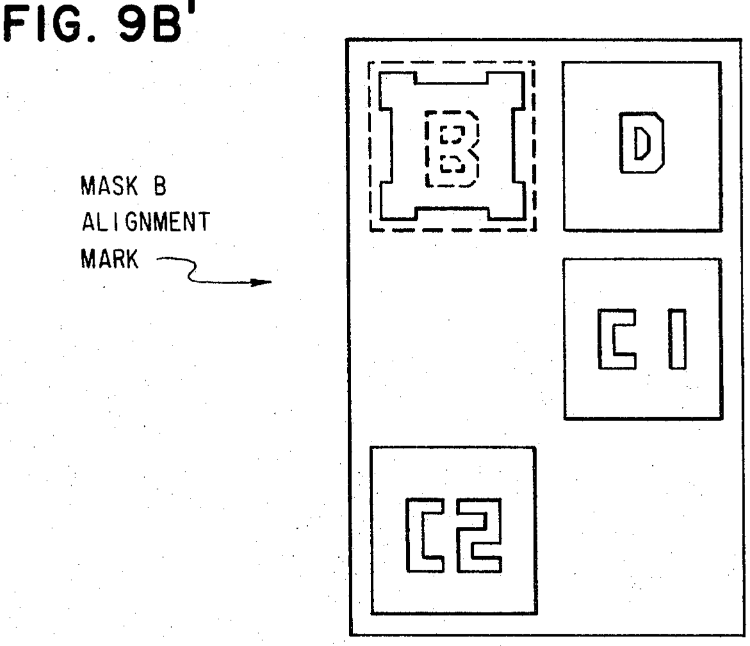
FIG. 9C1'
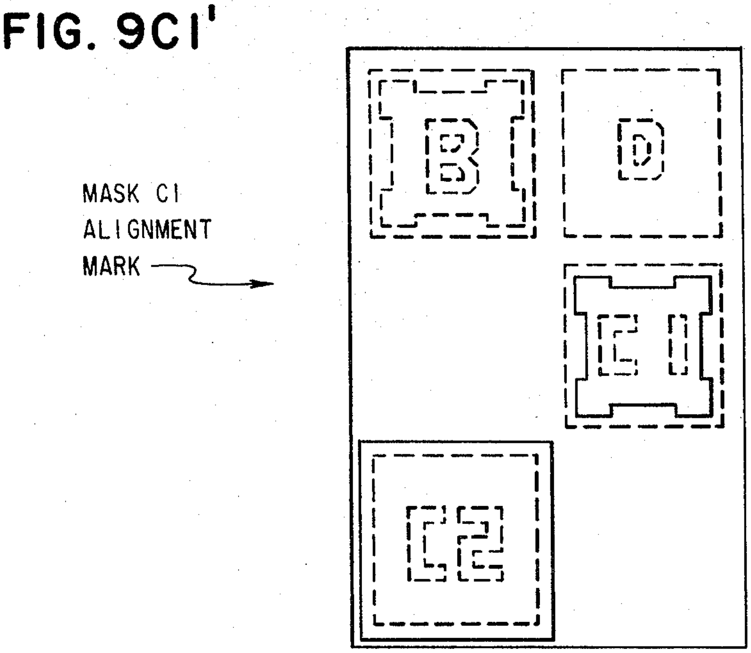

FIG. 9C2
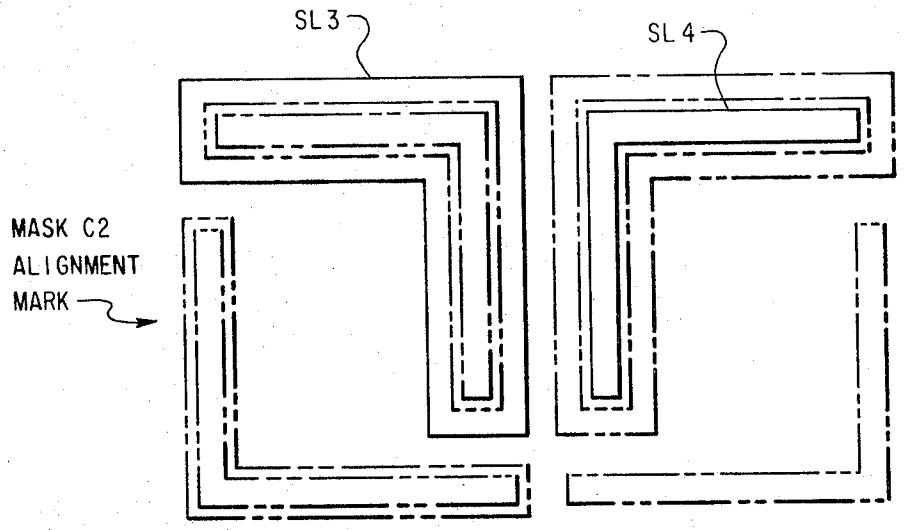
FIG. 9D
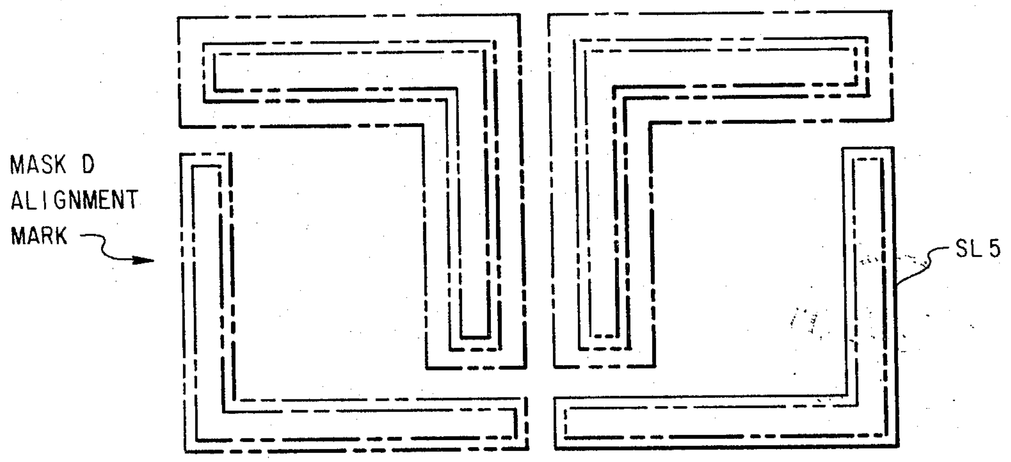

FIG. 9C2'
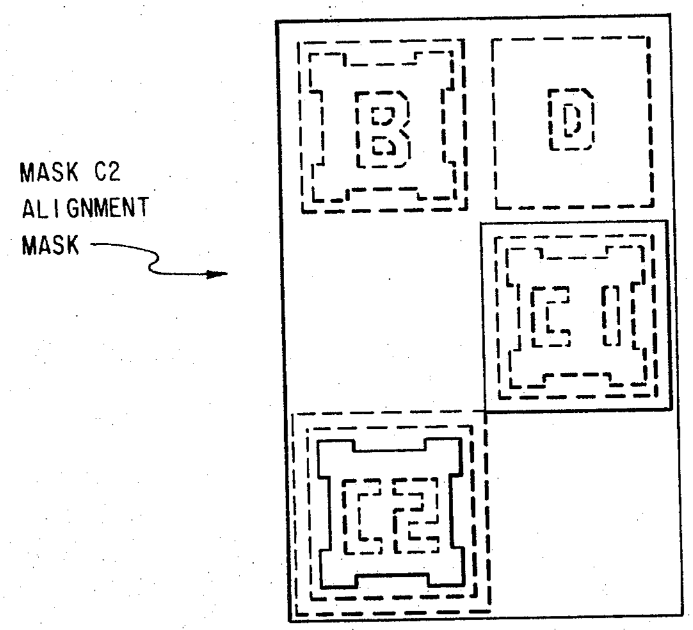
FIG. 9D'
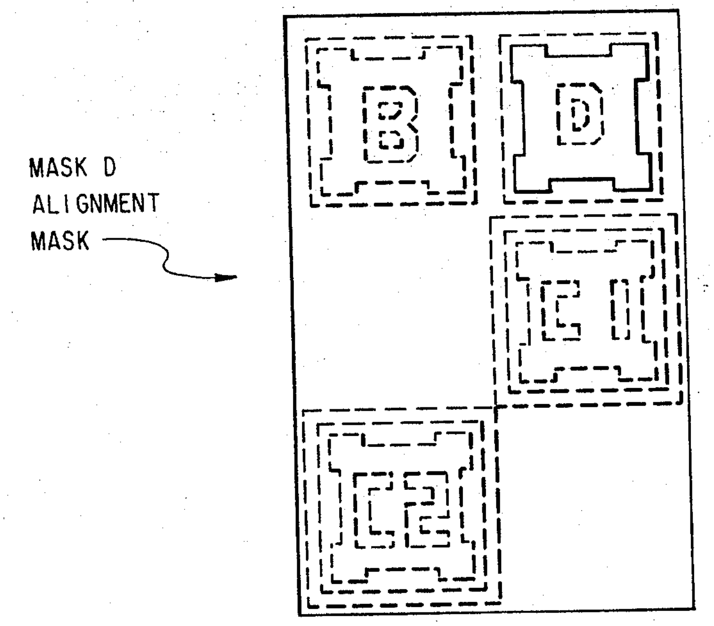

PROTECTIVE DEVICE
AND
TERMINAL PAD

FIG. 11 MOS PROCESS AND STRUCTURE
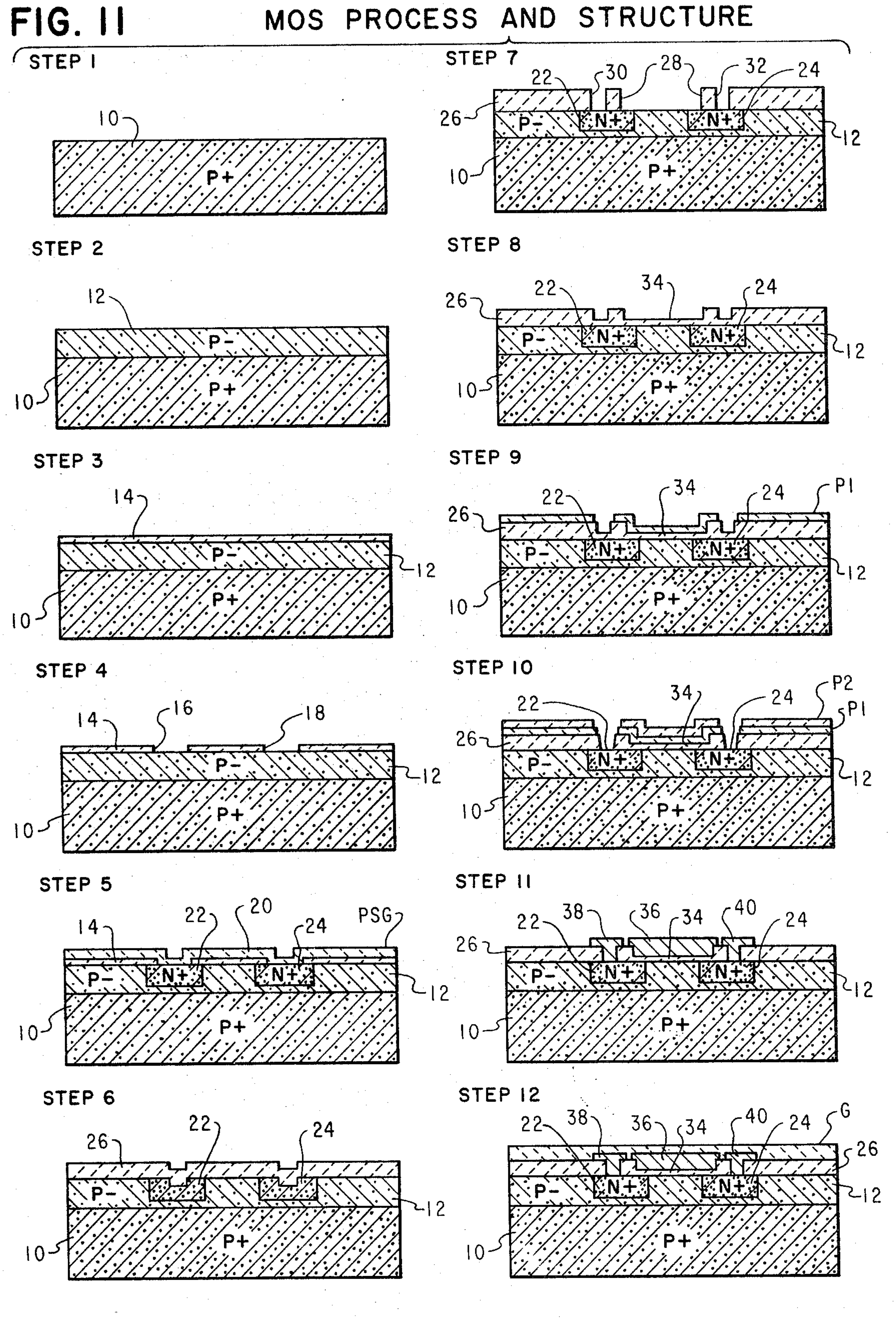

FET MEMORY CHIP INCLUDING FET DEVICES THEREFOR AND FABRICATION METHOD

BACKGROUND OF THE INVENTION

1. Field of the Invention

This invention relates generally to monolithic integrated semiconductor structures including devices used therein and fabrication methods therefor, and, more particularly, to monolithic integrated FET memory chips including FET devices and fabrication methods therefor.

2. Description of the Prior Art

In the past, various monolithic memory chips of both bipolar and FET types were developed and produced by semiconductor manufacturers to provide data processing systems, such as computers, with high speed semiconductor memory arrays. One example of a bipolar monolithic memory chip including the fabrication process therefor is disclosed in U.S. Pat. No. 3,508,207, inventors Benjamin Agusta et al. Various other publications have been made depicting both bipolar and FET memory arrays or systems.

In designing a high bit density, field effect transistor memory array on a semiconductor chip having a dimension as small as 125 mils × 125 mils, many problems existed in providing the required circuits for the memory array onto this small chip size especially where the amount of memory cells of the memory array contained 1,024 memory bits or circuits. Additionally, this small semiconductor chip had to include word inverter, bit inverter, bit decode and word decode circuits as well as a number of miscellaneous device structures necessary to accomplish the goal of providing a high speed, dense, fully decoded FET memory system or array in an almost microscopic chip of silicon or semiconductor material. Providing large amounts of circuits on a monolithic chip is generally designated as Large Scale Integration (LSI).

An enormous amount of technical factors had to be considered in achieving this desired goal which included new device designs to provide necessary electrical functions, optimum chip layout including location of terminals and circuits to obtain maximum memory array performance, and an easily manufacturable, highly reliable process which could be depended upon to produce FET memory array chips with high yield, speed, and stability. In the fabrication process, mask alignment problems had to be solved in order to achieve perfect alignment of the different masks with respect to each other so as to prevent fatal misalignment in making the devices of the chip which would naturally result in the formation of an inoperative chip or memory array.

By utilizing a small semiconductor chip and condensing a large number of circuits thereon, the speed of the circuits is greatly increased and the overall performance of the system is greater than by using a larger chip which may require running much longer conductive lines than used in a smaller chip which naturally would reduce the overall speed and efficiency of the semiconductor memory system or array. Additionally, the use of small chips provide speed and performance advantages for the modules or packages on which the chips are electrically and mechanically mounted. As a result, both modules and cards (containing modules) are all beneficiaries of small chip sizes and provide speed and performance advantages over modules and packages which utilize larger chips.

In the chip layout design, maximum yield and memory array reliability and operation is directly related to setting and maintaining minimum spacing rules for both diffused and metallized regions including minimum diffused spacing requirements around metal contact regions to diffused regions. Furthermore, besides solving the problems of locating the different terminals and functional elements of the memory system in a way which would result in optimum array performance, techniques had to be devised to rapidly carry current, with minimum current crowding conditions, generated in the substrate of the chip during FET device switching operations to terminal regions or pads located on the periphery of the chips.

In designing FET devices for use in memory arrays, most of the present semiconductor manufacturers are making P channel FET devices. P channel FET devices designate those devices that utilize P type source and drain regions and an N type substrate region which necessitates the formation of a P channel across the N type gate region to provide conduction between source and drain regions. A P channel means that the conductive channel between source and drain regions consists of holes rather than electrons thereby providing the P designation for the channel. P channel FET devices are much easier to design, develop and manufacture because this type of device is not readily sensitive to N type inversion effects that are created by silicon dioxide surface layers which could turn on N channel FET devices without any voltages being applied to the gate electrodes. However, N channel FET devices have a much higher transconductance which is at least two or three times greater than the transconductance of P channel FET devices. The reason for this higher speed of operation is due to the fact that the electrons forming the N channel have a much higher mobility than the holes forming the P channel.

Other features and factors of P channel FET devices versus N channel FET devices are a serious consideration to semiconductor manufacturers making FET memory arrays, however it is generally conceded that N channel FET devices are better operationally than P channel FET devices, but it is also known that the inversion problem makes manufacture of N channel devices very difficult.

Another problem in making FET devices is to achieve good alignment between source, drain and gate regions in order to avoid misalignment between these regions which would destroy or severely impair device performance. Techniques for forming gate regions in precise alignment with source and drain regions were needed. In order to obtain protection against parasitic capacitance effects from conducting metal lands, it is desirable to use thick oxide regions over the surface of the FET device, except for the gate region. It was generally considered to be a problem to make devices with low charge, thick oxide surface regions while retaining required diffusion profiles and channel spacing and also achieving precise etching of gate window, source and drain contact regions. Furthermore, while the use of double photoresist layer techniques was well known to avoid pinhole problems in masks, techniques using two photoresist layers had to be devised to compensate and correct for slight mask alignment errors while retaining the pinhole problem solving advantages of a double photoresist layer.

FET manufacturers also had the problem of obtaining each of the starting semiconductor substrates with the same consistent resistivity values in order to reproduce FET devices and circuits with the same electrical characteristics. Semiconductor wafer manufacturers could not consistently provide quantities of starting wafers with resistivity values within a tight range. Hence, a need existed for developing a technique to insure that FET devices could be consistently formed in substrates having the same resistivity value and thickness while preserving or achieving other desired device, circuit or memory system characteristics.

In depositing metal onto the substrate for device contact and circuit interconnection, usual metal deposition techniques could not be relied upon to consistently produce low charge metal layers on charge sensitive gate regions which are formed using thin oxide or insulating layers. Accordingly, a need existed for a technique of depositing sufficiently large quantities of very low charge metal for FET device contact and circuit interconnection purposes. Additionally, etching techniques had to be devised to etch out and precisely define conductive metal land patterns having very small dimensions and strict spacing requirements to achieve high device and circuit densities.

After metal deposition and etching operations, techniques were needed to provide a low charge, encapsulating, pinhole free, insulating material to protect metal conductive patterns and the FET devices from attack by contaminants.

Finally, after individually solving all of the above technical problems, it was still necessary to combine and choose the proper solutions so that in integrating all of these to make a complex, dense, high speed, sensitive, N-channel FET memory array none of the selected solutions created technical problems that could not be solved by the other selected solutions.

SUMMARY OF THE INVENTION

It is an object of this invention to provide an improved FET memory array or system in a monolithic semiconductor chip.

It is another object of this invention to provide improved N-channel FET devices which contain geometries and configurations such as to provide maximum device characteristics with minimum space use.

It is a still further object of this invention to provide an improved method for forming an FET device for use in a FET memory array.

It is still another object of this invention to provide solutions to the above identified problems which permit the manufacture of a FET memory system in a semiconductor chip.

The foregoing and other objects, features and advantages of the invention will be apparent from the following, more particular description of the preferred embodiments of the invention, as illustrated in the accompanying drawings.

BRIEF DESCRIPTION OF THE DRAWING

FIGS. 9A, 9B, 9C1, 9C2 and 9D depict one set of alignment marks used in aligning each of the masks required in fabricating the FET memory array chip of this invention.

FIGS. 9A', 9B', 9C1', 9C2', and 9D' depict another set of alignment marks used in aligning each of the masks required in fabricating the FET memory array chip of this invention.

FIG. 11 is a flow diagram, in sectional form, showing each of the steps in the fabrication process for forming each of the FET devices used in the FET memory array chip of this invention.

Referring to FIG. 1, a FET memory array chip 100 is shown in a schematic or block diagram form showing the interconnection of the memory cells of the chip, the one bit and two word decode elements, the bit and word inverters and the different terminals connected to the various elements of the memory system, the protective devices and the chip substrate. One FET memory system that can be used in the monolithic memory array chip 100 of this invention is electrically shown and described in the co-pending patent application entitled "Dynamic MOS Memory Array Chip," filed 8/19/70, inventors C. A. Allen and Donald F. Lund, Ser. No. 65,197 U.S. Pat. No. 3,685,027 and assigned to the same assignee as this invention. In this co-pending patent application, the operation and function of the FET memory system depicted in the memory chip 100 is fully described. Other co-pending patent applications are referred to in the co-pending Allen et al. application for the description and operation of an entire FET memory system. Accordingly, the above identified Allen, et al. co-pending patent application and the other co-pending patent applications referred to therein are herewith incorporated by reference and made part of this patent application.

Figure 1:
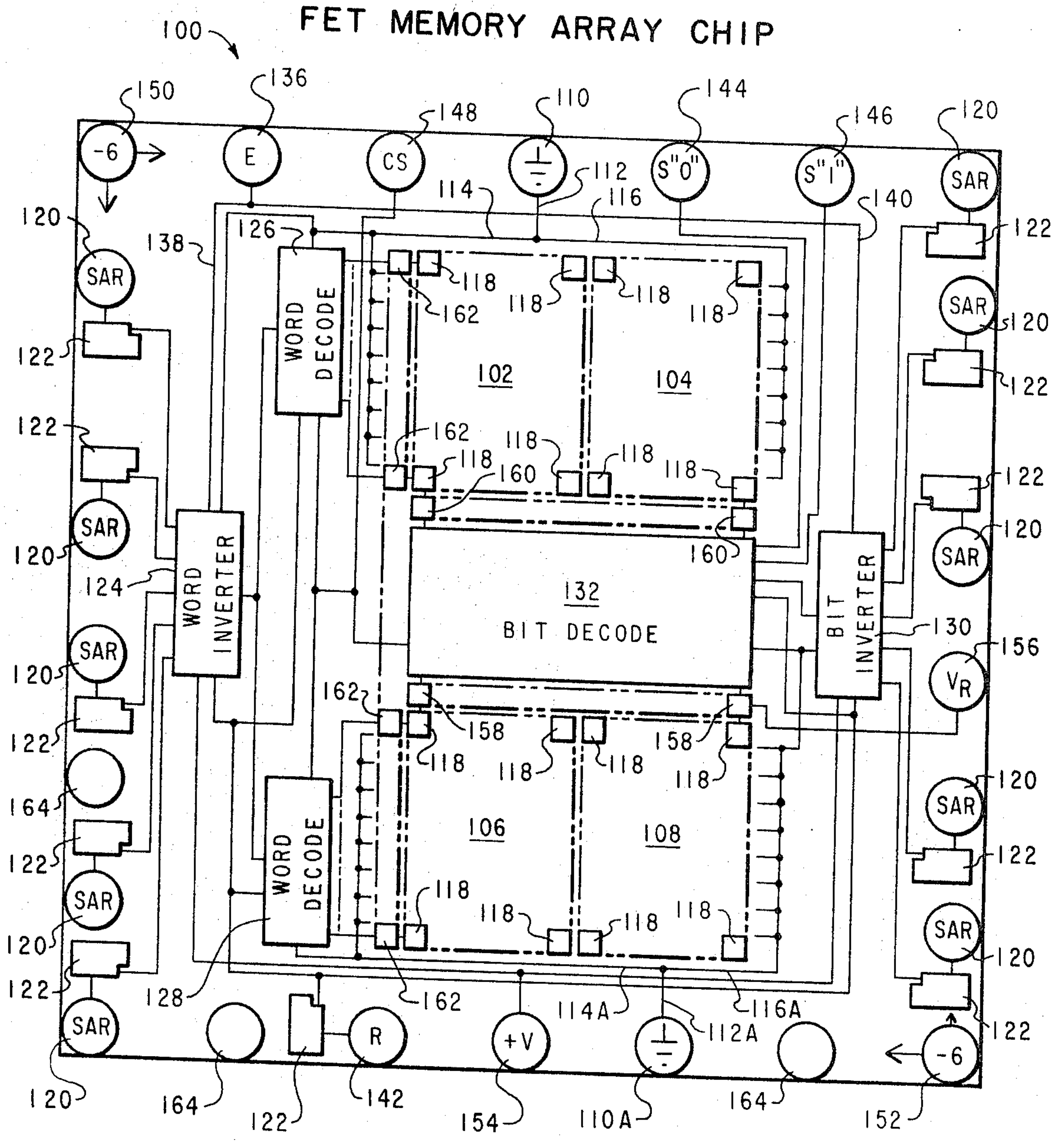
FIG. 1 is a top planar view in substantially block or schematic form of a FET memory array chip in accordance with this invention.

The FET memory array chip 100 contains, for example, a 1,024 bit or circuit memory array. Each of the 1,024 memory bits or circuits is, preferably, composed of a four device FET memory cell as shown and described in the above identified Allen et al. patent application. The 1,024 bit memory array is depicted in FIG. 1 as comprised of four blocks of 16 × 16 memory cells numbered respectively, 102, 104, 106, and 108. Accordingly, each 16 × 16 block of memory cells contains 256 memory circuits or bits interconnected to form the 16 × 16 block. Each of the memory cells located in each of the rows extending from one end of block 102 to the far end of block 104 is connected to a terminal pad 110 which is at ground potential. Electrical lead 112, which is a conductive land located on an oxide surface layer of the chip is electrically connected to the ground pad 110 and serves to connect up each row of cells from blocks 102 and 104 to the ground pad 110 by means of conductive lands or leads 114 and 116. By providing conductive lands 114 and 116 in a fanout arrangement to supply a ground potential to both ends of each row of memory cells in each of the 16 × 16 blocks 102 and 104, serious potential drops, which can effect device and circuit performance, are avoided in this manner than by using a single lead (114 or 116) to supply the ground potential to an entire row of memory cells defined by both blocks 102 and 104. Similarly, ground pad 110A in the lower half of the memory array chip 100 serves to provide a ground potential to each row of memory cells in memory blocks 106 and 108 by means of conductive lands 112A, 114A, and 116A. In this manner, by providing two ground pads 110 and 110A located in optimum portions of the chip, a substantially uniform ground potential is supplied to each of the memory cells in the memory array. Boxes 118 in each block of the memory array designate a memory cell or circuit that provides a bit of information. The layout of the memory cell or circuit identified by block 118 is more clearly shown in FIG. 2. Ten SAR terminal pads 120 are shown at the periphery of the chip 100 and on the left and right side thereof. The operation of the SAR terminals is described in the above identified co-pending patent application of Allen et al. Electrically connected to each SAR terminal pad is a protective device 122. Each of the protective devices serve to prevent a high voltage pulse from being applied to the voltage sensitive gate electrodes located on the thin oxide gate regions of the FET devices of the memory array. The protective devices 122 are formed at the same time as the formation of the source and drain diffused regions of each FET device. Hence, in the embodiment, the protective devices are a N+ diffused region having an input terminal and an output terminal electrically connected to spaced portions of the diffused region. The five SAR terminal pads shown on the left side of the chip 100 are electrically connected through each of their protective devices 122 to a word inverter 124. True and complement outputs from the word inverter 124 are connected to both 16 word decode elements 126 and 128, respectively, located in the upper and lower left side portions of the memory chip 100. On the right side of the memory chip 100 the five SAR terminal pads 120 are each connected through their resistor protective devices 122 to a bit inverter 130. The true and complement outputs from the bit inverter 130 are electrically connected to bit decode element 132. An enable (E) terminal pad 136 is electrically connected to both the word inverter 124 and the bit inverter 130 by means of conductive lands 138 and 140, respectively. A restore (R) voltage source is provided by terminal 142 which is electrically connected through its associated protective devices 122 to the word inverter 124, both word decode elements 126 and 128, the bit inverter 130, and the bit decode element 132. A S"0" terminal pad 144 and a S"1" terminal pad 146 are each electrically connected to both bit decode elements 132 and 134. A chip select (CS) terminal pad 148 is electrically connected to both of the 16 word decode elements 126 and 128 and the bit decode element 132. A Upper left and lower right corner terminal pads 150 and 152 serve as the means for providing a substrate bias potential to the P type substrate of the FET memory chip 100. The terminal pads 150 and 152 are biased at −6 volts. Terminal (+V) pad 154 serves to provide a positive voltage (+10 volts) to both the word inverter 124 and the bit inverter 130 thereby serving as a power supply to both of the inverters. Terminal ($V_R$) pad 156 supplies +5 volts to the drain electrode of each refresh device 158 (64 refresh devices are located in substantially the center of the chip 100) which supplies refresh current to all of the memory cells in all four blocks of the memory array. The conductive lines to the memory cells with the upper blocks 102 and 104 from the refresh FET devices 158 are not shown, but are combinations of underpass and conductive land lines going through the bit decode element 132 to each of the 32 columns of memory cells defining the memory array. By locating each refresh device 158 substantially in the middle of the chip 100, it is possible to supply substantially the same amount of refresh current to all of the memory cells 118 of the memory array which could not be readily accomplished if the refresh devices 158 were located at one end portion of the chip 100. Also, by locating the bit decode element 132 in the center of the chip 100, increased memory speed is achieved because it is quicker to drive through half (column of 16 cells) the memory cells associated with the bit decode element than by providing a bit decode element at the end portion of the chip to drive through a 32 cell column. This is especially significant in a chip layout as depicted in FIG. 1 where current is partly conducted through high impedance underpass regions and cannot be conducted solely along metal conductive lands because of interference with other elements of the memory array. Hence, by locating these elements in the center of the chip 100, voltage drops, which can affect circuit performance for those cells located near the far end of the chip, can be avoided. The refresh devices 158 are shown in greater detail in FIG 5 and are made up of two 20/1 FET devices having a common contact to a common diffused region serving as source or drain depending upon the state of operation of the FET device, a common gate electrode overlying both of the "crooked" gate regions of the combined two FET device structure, and separate contacts to the two separate diffused regions serving as the drain or source region depending upon the state of device operation.

Figure 7:
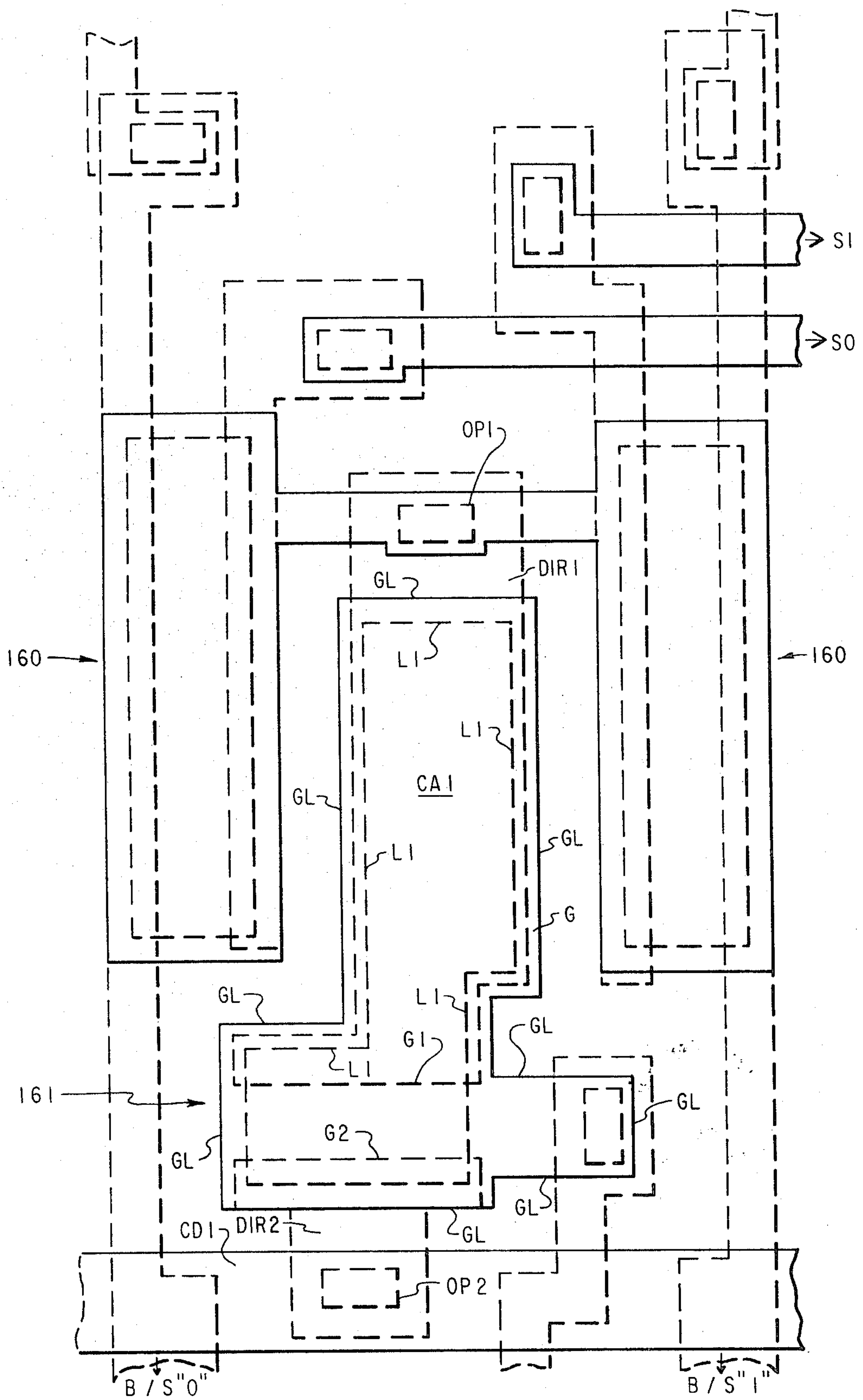
FIG. 7 is a top view similar to FIG. 6 showing a FET device having a linear gate and a capacitor device associated with the gate.

The bit decode element 132 is electrically connected to 64 FET devices 160 which serve as the devices T17 and T18 of the bit line switches in the Allen et al patent application for selecting cells during read and write operations. The FET devices 160 are 10/1 devices and are connected to each of the 32 columns of cells on both sides of the array. The FET devices 160 are shown in FIG. 7 which describes in detail a 4.5/1 FET device used in driving both FET devices 160.

FET devices 162 are connected to the word decode elements 126 and 128. Accordingly, 16 FET devices 162 are connected to each word decode element. The FET devices 162 are shown and described in more detail in FIG. 6. Each of these devices is a 13.5/1 drive device for supplying current to the word line and is used in selecting cells during read and write operations. These devices are shown in the Allen et al. application as the FET devices off the WL0, WL3, WL14 and WL31 lines in FIG. 1.

Three dummy or spare terminal pads 164 are provided at the bottom and left side of the chip 100. A conductive underpass (under the terminal pads) and conductive land region extends around the entire periphery of the chip and is electrically connected to the corner pads 150 and 152 as indicated by the arrows shown extending in both directions from each of these corner pads. This conductive band around the periphery of the chip 100 is very important since it permits current entering the P type substrate region during device switching to be quickly carried out to the corner pads 150 and 152 by means of the high conductivity P+ substrate and the peripheral band of conductive land and underpass N+ regions extending under the terminal pads located between the corner pads 150 and 152. The importance of this arrangement is to prevent current crowding in the P type substrate which takes place without the benefit of this rapid current drawing technique. Accordingly, the speed of operation of the memory system of the chip 100 is improved because the transient voltage stability of the substrate bias is improved.

Figure 2:
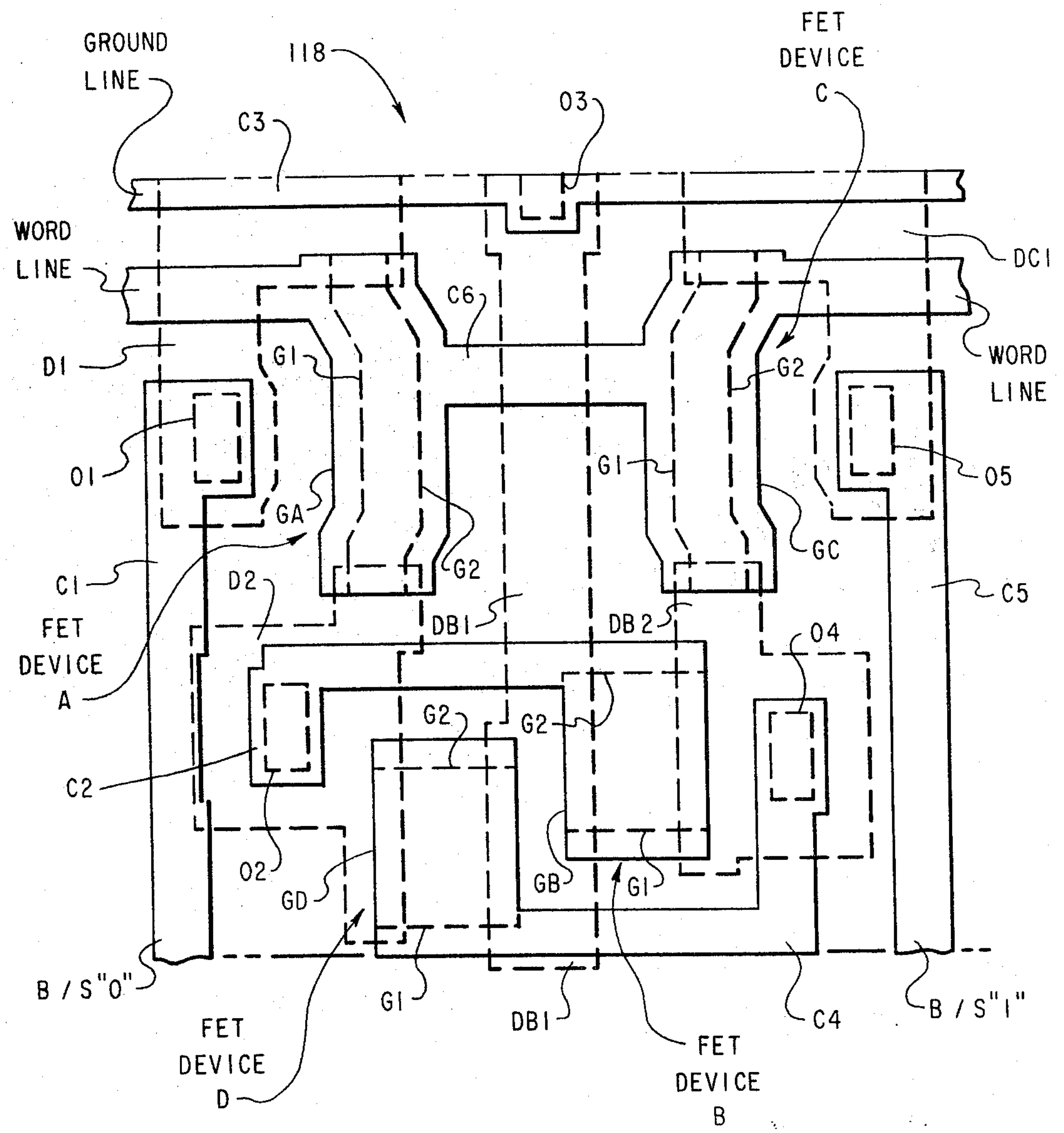
FIG. 2 is an enlarged top view of one (four FET device) memory cell used in the memory array chip of FIG. 1 showing the diffused regions, the metallized interconnecting conductive land pattern, and thin oxide regions under the gate portions of the FET devices.

Referring to FIG. 2, the memory cell 118 is shown as it appears in the memory array or chip 100 of FIG. 1. The solid lines in this figure designate the conductive metal land pattern while the dotted lines in this figure designate a thin oxide gate region beneath the gate electrode or designate diffused regions of N+ type conductivity used to form the source, drain and underpass regions. Additionally, contact openings through the insulating layer on the semiconductor chip to provide metal contact to the diffused regions are shown in dotted box form within end portions of conductive metal lands.

With specific detailed reference to FIG. 2, a field effect transistor device designated FET device A is shown as having a "crooked" gate electrode GA, one N+ diffused region D1 which can serve as source or drain depending upon circuit operation, and a second N+ diffused region D2 which serves as the drain or source region depending upon circuit operation. Electrical contact is made to the region D1 by means of metal land conductor C1 through contact opening O1 in the oxide layer beneath the conductor C1 thereby permitting electrical contact to be made to the underlying diffused N+ region D1. As can be seen with reference to the FET device A, the gate or channel region between the source and drain diffused regions is defined by the "crooked" pair of dotted lines G1 and G2. Dotted lines G1 and G2 define the bounds of the thin oxide region that underlies the gate electrode GA and thus defines the true location of the channel between the source and drain diffused regions of the FET device A. The channel length L is defined as the distance between source and drain diffused regions and the channel width W is defined as the distance across the channel area which is perpendicular to the channel length. Hence, a gate ratio of 1/4.25 (W/L) is the dimension of the gate for FET device A. Electrical contact is made to the diffused region D2 of FET device A by means of contact opening O2 in the oxide layer which permits electrical contact to be made between conductor C2 and the diffused region D2.

Conductor C2 extends and electrically connects the diffused region D2 of the FET device A to the gate electrode GB of FET device B. The gate GB of the FET device B has the thin oxide region shown therein by the lines G1 and G2 in the area defined by the gate electrode GB. The W/L ratio of the gate GB is about 2.75/1. One diffused region DB1 serves as either source or drain region for the FET device B and a second diffused region DB2 alternatively serves as drain or source region for the FET device B. Electrical contact is made to the diffused region DB1 by means of conductor C3 (partially shown) located at the top of FIG. 2 which runs across and connects similar diffused regions for each of the memory cells in the same row of cells. Opening O3 in the oxide layer serves to permit electrical contact to be made between the conductor C3 and the diffused region DB1. Diffused region DB2 serves also as either a source or drain region for FET device C and electrical contact to this diffused region is provided by conductor C4 and opening O4 in the oxide layer.

The FET device C is substantially identical to the FET device A and both use "crooked" gates. The "crooked" gates of FET devices A and B permit condensing the memory cell 118 into a smaller area than could be achieved without these gates while still preserving preset, minimum spacing rules that have to be maintained in order to achieve maximum chip yield and performance. Gate GC of the FET device C has the same W/L ratio as the gate GA of the FET device A. Diffused region DC1 serves as a diffused drain or source region for the FET device C depending upon the use of the associated source or drain region DB2 of the FET device C. Electrical contact is made to the diffused region DC1 by means of conductor C5 going through opening O5 in the oxide layer. The conductors C1 and C5 extend downwardly and provide (by means of underpass regions) electrical contact to the memory cells in the column of cells below the memory cell 118 shown in FIG. 2. Similarly, diffused regions D1 and DC1 serve as underpass conductive regions (beneath conductor C3) and extend upwardly to the memory cells located in the same column as memory cell 118 shown in FIG. 2. The gate electrode GA and GC of the FET devices A and C, respectively, are electrically tied together by means of conductor (metal land) C6.

Conductor C4 extends from electrical contact to the diffused region DB2 to gate electrode GD and this conductor is electrically connected to the gate electrode GD of FET device D. The source and drain regions for the FET device D are provided by the diffused regions D2 and DB1 which are also associated with FET device A and FET device B, respectively. Gate GA of FET device A and gate GC of FET device C extend into conductive lands which are the word lines. The ground line from the ground terminal 110 is the conductor C3. Conductors C1 and C5 are B/S "0" and B/S "1" lines.

The memory cell has side dimensions of about 2.7 by about 3.0 mils. The thickness of the conductive land lines is about 0.15 mils and the minimum spacing between adjacent metal conductive lands is about 0.175 mils. A minimum spacing of 0.125 mils is provided and maintained about each contact opening O1, O2, O3, O4, and O5. By maintaining this required spacing around the contact openings, some over-etching and slight misalignments can be tolerated in the manufacturing process without resulting in memory array failure. The added diffusion bulges around the contact openings to maintain a uniform, minimum diffused region around the contact holes especially for contact openings O1 and O5 required a solution to the problem of providing a gate with a channel region that did not violate minimum spacing rules between the channel region and adjacent diffused regions. Accordingly, both of the gates GA and GC and associated channels of the FET devices A and C, respectively, were made "crooked" in order to maintain required minimum spacing between the channel region of the gates and the diffused region about the contact openings O1 and O5.

Figure 3:
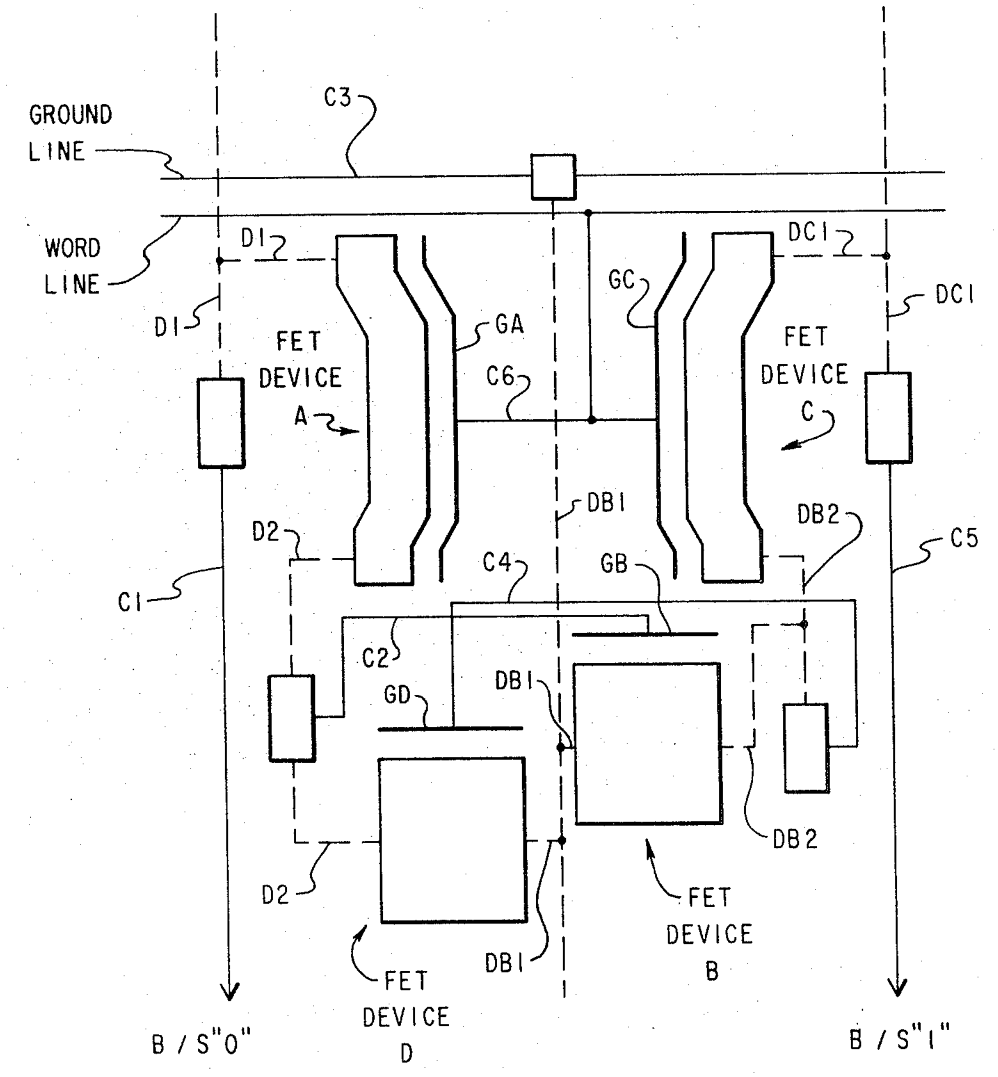
FIG. 3 is an electrical schematic overlay representation of the FET memory cell of FIG. 2 to show the FET devices and the interconnecting conductive lands or lines.

FIG. 3 is an electrical schematic representation of the memory cell layout of FIG. 2 which more clearly shows the electrical interconnection of the four FET devices. The same applicable reference numbers used in FIG. 2 are used in FIG. 3 to designate the various diffused regions and metal interconnections to the four FET device memory cell.

Figure 4:
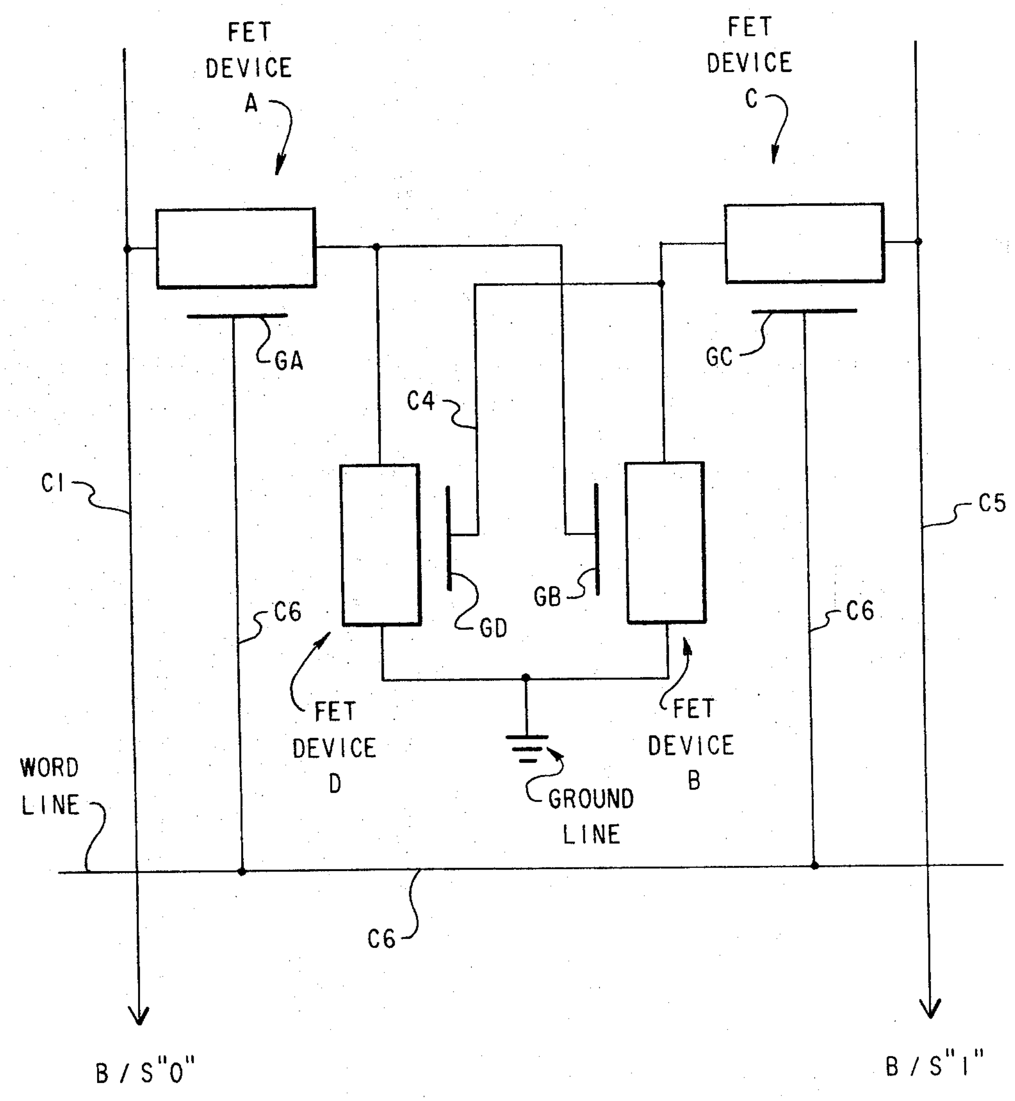
FIG. 4 is an electrical schematic representation shown in a clearer circuit layout configuration of the FET memory cell of FIGS. 2 and 3.

FIG. 4 is a rearrangement, without changing the memory circuit or arrangement of the electrical connections, of the same circuit of FIG. 3 in order to show the memory cell or circuit described in the Allen et al application. In this figure, the same reference numbers are used as in FIGS. 2 and 3 except for the diffused regions.

Figure 5:
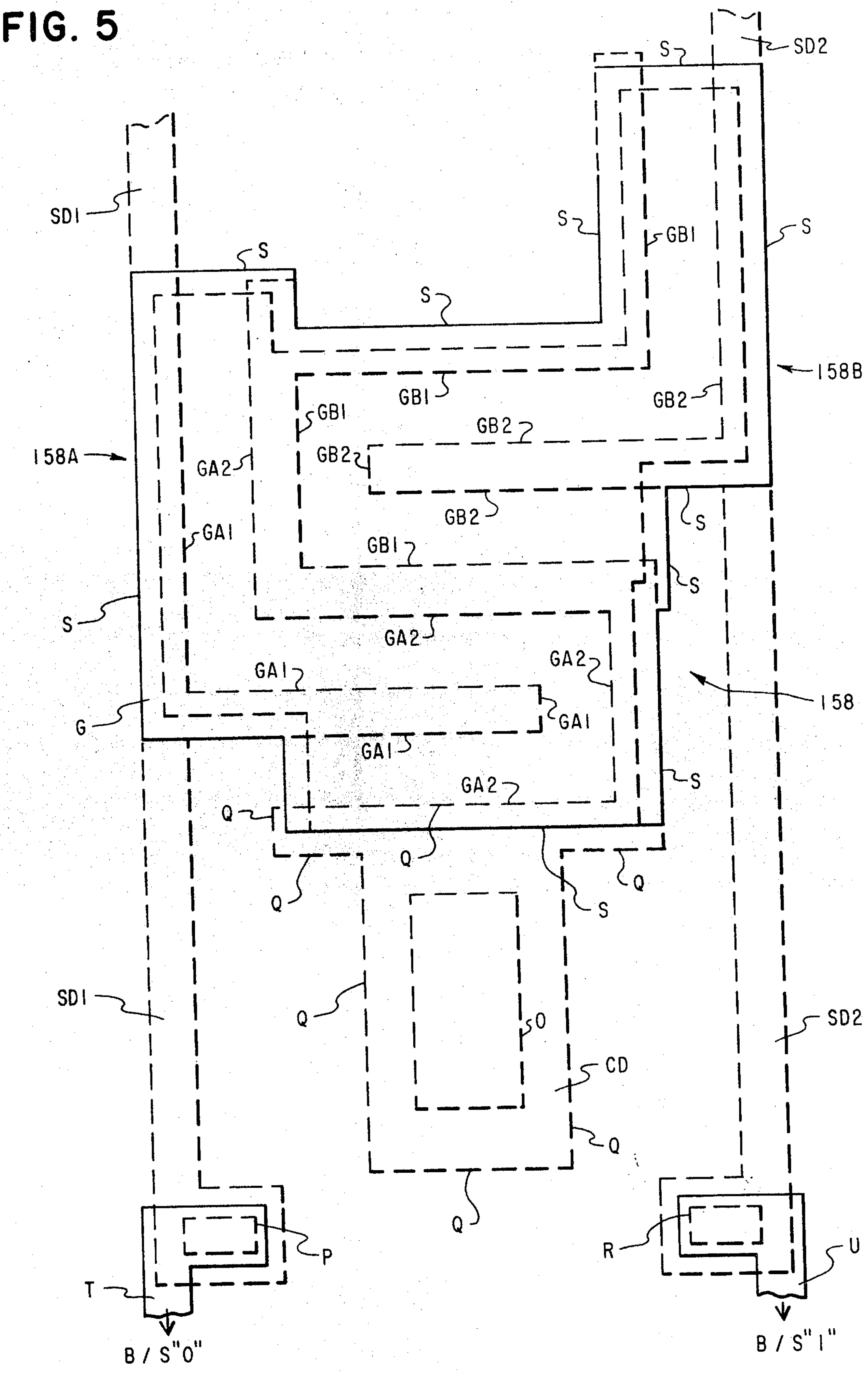
FIG. 5 is a top view showing metallized, diffused and thin oxide regions under gate electrodes of two FET devices used as a refresh device in the memory array having a common source or drain contact to one diffused region, overlaying common gate electrode, and separate drain or source contacts.

FIG. 5 illustrates in detail the 20/1 refresh FET device 158 shown in block form in the memory chip 100 of FIG. 1. The refresh FET device 158 is composed of two 20/1 FET devices 158A and 158B having a single gate electrode G outlined by the connecting solid lines. The "crooked" channel for the FET device 158A is defined by the two dotted lines GA1 and GA2. Similarly, the "crooked" channel for the FET device 158B is defined by the two dotted lines GB1 and GB2. Electrical contact is made to common diffused region CD which is a non-linear diffused region winding through the device 158 and serving as either a source or drain region for both FET devices 158A and 158B. The outline of the common diffused region CD is defined by the dotted line Q except where portions of the dotted line GA2, solid line portions S, and portions of the dotted line GB1 define the boundary of the diffused region Q. Opening O shown as a large dotted box at the bottom end portion of the common diffused region Q defines the contact opening to this region. Separate diffused regions SD1 and SD2 provide the other two diffused regions necessary to define the two FET devices 158A and 158B, respectively, with the common diffused region CD. The separate diffused region SD1 runs along the left side of the figure and has an indented portion at the lower stepped corner of the gate electrode G which runs to the right under the gate electrode G and is primarily defined by the dotted line portions GA1 at that location. Similarly, separate diffused region SD2 runs along the right side of the figure and has an indented portion at the upper stepped corner of the gate electrode G which runs to the left under the gate electrode G and is primarily defined by the dotted line portion GB2 at that location. Contacts to the separate diffused regions SD1 and SD2 are provided at the lower end portions of these two diffused regions as shown by oxide openings P and R (dotted boxes) and conductors T and V, respectively.

Figure 6:
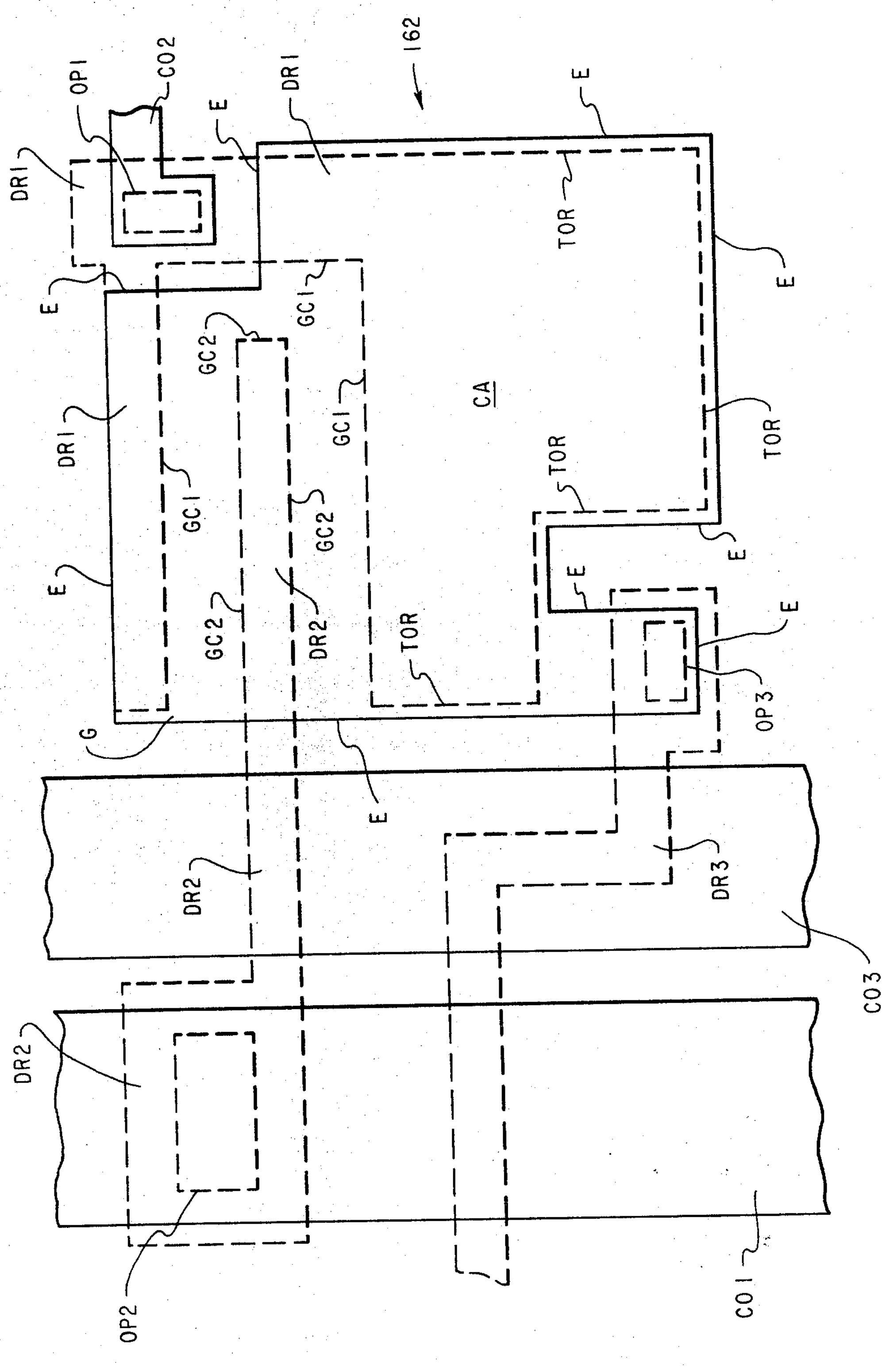
FIG. 6 is a top view similar to FIG. 5 showing a FET device used as a word line drive device for supplying current to the word lines having a non-linear gate and a capacitor associated with the gate.

FIG. 6 depicts one 13.5/1 FET device 162 shown in box form in FIG. 1. Each FET device 162 is associated with a word line and helps select memory cells during write and read operations. The FET device 162 shown in FIG. 6 has a gate electrode G defined by the solid lines E and a non-linear channel defined by the dotted lines GC1 and GC2. One diffused region DR1 serves as either a source or drain region for the FET device 162 and a second diffused region DR2 serves as a drain or source region for the FET device 162. Contact openings OP1 and OP2 (in dotted box form) permit electrical contact to be made to the respective diffused regions DR1 and DR2. Conductor CO1 provides electrical contact to the diffused region DR2 by means of opening OP2 and conductor CO2 provides electrical contact to the diffused region DR1 by means of opening OP1. Conductor CO3 is an overpass conductor going to another portion of the array.

FIG. 7 illustrates in more detail the 4.5/1 FET device 161 for driving the two bit line switch devices 160 shown in block form in FIG. 1. Two 10/1 FET devices 160 are shown having their gate electrodes electrically connected to a diffused region DIR1 by means of opening OP1 in the oxide layer. The diffused region DIR1 serves as one electrode of a capacitor CA1 which is formed by thin oxide region (outlined in dotted form by lines LI). The other electrode of the capacitor CA1 is the extension of the gate electrode G defined by solid lines GL. The diffused region DIR1 serves as a source or drain region for the FET device 16 and the linear channel under the gate electrode G identified between dotted lines G1 and G2 which respectively serve as boundary lines for the diffused region DIR1 and a diffused region DIR2. The diffused region DIR2 serves as the drain or source region for the FET device 16. Conductor CD1 is electrically connected to the diffused region DIR 2 by means of opening OP2 in the oxide layer.

Figure 8:
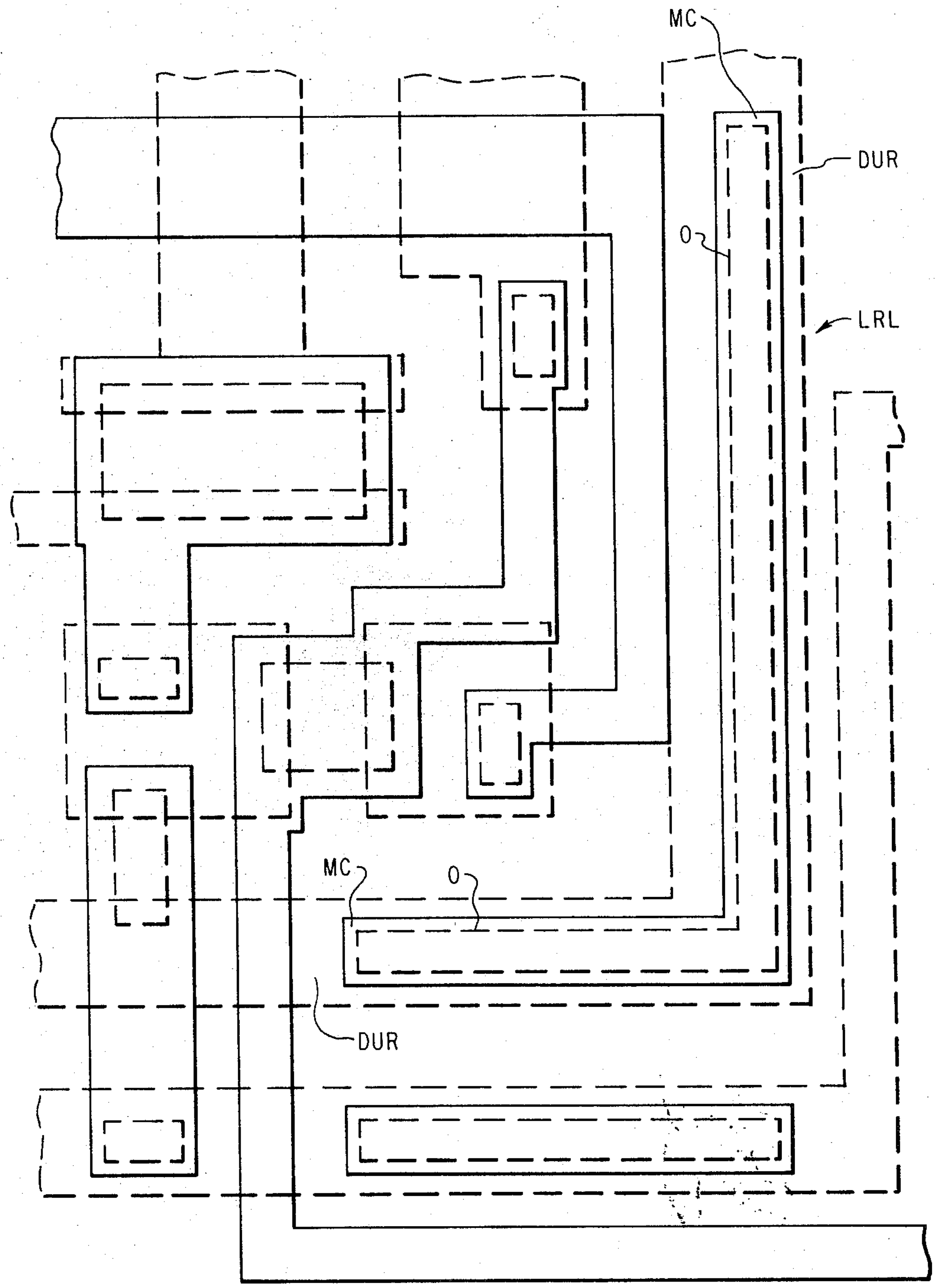
FIG. 8 is a top view showing an electrically conductive metal contact connected to a diffused semiconductor region for use in providing a low resistance, electrically conductive path in the FET monolithic chip of this invention.

FIG. 8 depicts a portion of the chip 100 wherein a low resistance conductive line LRL is provided in order to significantly reduce the resistance provided by either a conventional, diffused, underpass region or by two spaced electrical contacts (located adjacent to and spaced from a conductor crossing over the underpass region) provided at the portions of a diffused underpass region closest to the perpendicular, crossing, conductors. For example, assume 3 metal conductors 0.2 mils wide running parallel to each other and separated by 1.7 mils (the two outer conductors are to be connected together). If they are connected using an N+ underpass diffusion of 7 ohms per square and two small metal-to-diffusion contacts each having 15 ohms contact resistance, then the total conductor-to-conductor resistance would be about 149 ohms. If the two outer conductors are extended toward the center conductor to within 0.2 mils and are then connected by two small contacts and a short N+ underpass, the total conductor-to-conductor resistance would be about 51 ohms. Using the technique illustrated herein, an N+ underpass is connected between the outer conductors with a metal-to-diffusion contact running its entire length to within 0.2 mils of the center conductor. The resistance using this technique is about 26 ohms which is considerably less than the previous two arrangements and provides a substantial improvement in the circuit performance. The low resistance conductor LRL has a total resistance that is substantially lower than the total resistance that would be provided using either of the other two techniques described above. The low resistance conductor LRL is made up of a metal conductor MC that is in electrical contact to a diffused underpass region DUR by means of opening O (in dotted box configuration). The extended metal contact MC, which has an inverted L-shaped configuration, substantially reduces the resistance of the combined diffused metal conductor.

FIGS. 9A, 9B, 9C1, 9C2 and 9D depict the alignment marks used on the masks for making the FET chip 100 of FIG. 1. Mask A is used to define the N+ regions (source, drain, etc.), mask B is used to define the source and drain contact holes and the gate window, mask C1 is the first blockout mask for the first photoresist layer, mask C2 is the second blockout mask for the second photoresist layer, and mask D is the metallization pattern mask.

FIG. 9A depicts the alignment mark that appears on mask A (shown as an L-shaped mark). FIG. 9B depicts the alignment mark (four L-shaped marks) that appear on mask B. The mark shown in dotted form is the previous mark used in mask A and is used with the smaller mark in mask B to align mask A with mask B (if the solid mark of mark B is within the dotted mark of mask A as shown in FIG. 9B). FIG. 9C1 depicts the alignment marks (two L-shaped marks SL1 and SL2 in solid lines and the other alignment marks from previous masking operations are shown in dotted form. FIG. 9C2 is like FIG. 9C1 and shows two alignment marks SL3 and SL4 (in solid lines) used in relation to the previous alignment marks of the previous masks (in dotted form). FIG. 9D depicts single alignment mark SL5, shown in solid lines, used for mask D. The previous alignment marks used in the previous masks are shown in dotted form.

Similarly, FIGS. 9A', 9B', 9C1', 9C2' and 9D' depict another set of alignment marks that can be substituted for the set of alignment marks shown in FIGS. 9A, 9B, 9C1, 9C2 and 9D. Instead of an L-shaped alignment mark, letter blocks are used to define the alignment marks and also help designate the different mask operations. FIG. 9A' illustrates the B letter block mark used on mask A. FIG. 9B' illustrates the three additional letter block marks D, C1 and C2 used in mask B. FIG. 9C1' illustrates the blockout marks used for the mask C1. FIG. 9C2' illustrates the blockout marks used for the mask C2. FIG. 9D' illustrates the block marks used in the mask D.

Figure 10:
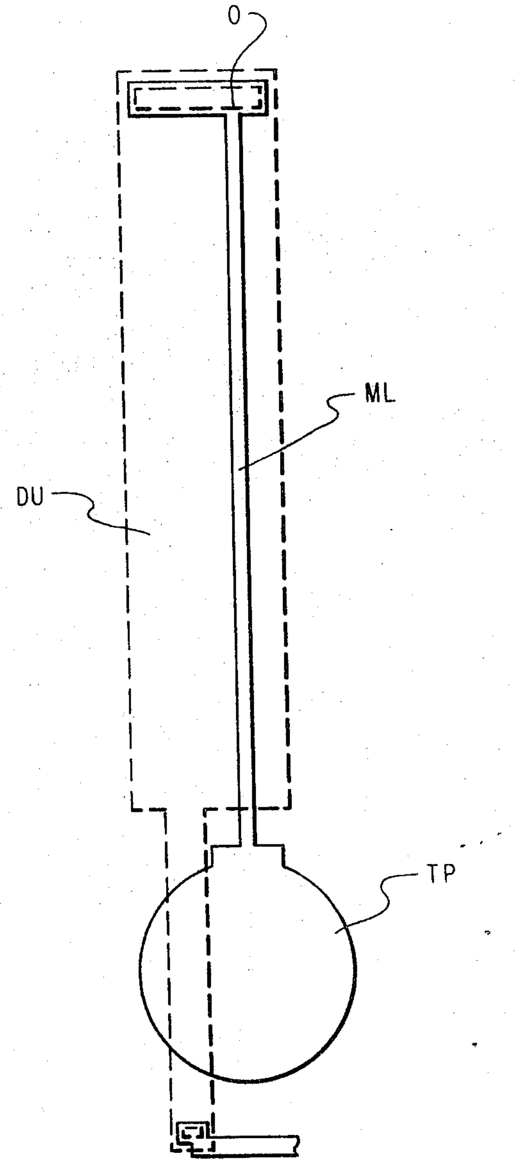
FIG. 10 is a top view showing one terminal pad, metal electrically conductive land in contact with and leading away from the pad in one direction, and a buried, diffused conductive protective device underpass in electrical contact to the land and located partly under the pad so as to direct the conductive electrical path out to the portion of the chip on the other side of the pad in order to connect up to a desired electrical device.

FIG. 10 illustrates the formation of a conductive path from a terminal pad TP which leads away from the pad TP in one direction (by metal land ML and then comes back under the pad TP (by means of contact opening O, in dotted box form, and diffused underpass DU) to go in the desired direction. This design permits the use of a large protective device provided by the diffused region DU and the contacts thereto.

FET PROCESS DESCRIPTION

With reference to the process of making the FET devices of this memory array, a number of different processing techniques were previously devised to manufacture field effect transistor devices. One technique that was used in fabricating field effect transistors of the insulated gate type was, as described and shown in the co-pending patent application entitled "Technique for Fabrication of Semiconductor Device," inventors Vir A. Dhaka, et al., filed Aug. 29, 1969 and assigned to the same assignee of the present invention, to form the insulating gate layer prior to the formation of the source and drain regions.

Another technique in the fabrication of a field effect transistor device was to form the gate insulating region after the formation of source and drain regions. An example of this latter type is described and shown in the co-pending patent application entitled "Semiconductor Device and Fabrication Method Therefor," inventors James L. Reuter et al., filed May 19, 1969 and assigned to the same assignee of this invention.

In this latter example, the original oxide over the gate region was first completely removed, a thin oxide layer was then grown or deposited on the silicon surface and a gate electrode was then formed on the thin insulating layer. The gate electrode was formed after holes had been etched out for the formation of contacts to the source and drain regions. Consequently, the source and drain contact holes were etched out after the etching out and formation of the gate oxide layer.

A disadvantage associated with some prior art FET processes is that the doping concentration and/or thickness of the glass oxide or surface insulating layer were usually too variable across the surface of the semiconductor substrate. Consequently, it was impossible to etch or open up a number of predetermined areas in the oxide without some over-etching (causing undercutting) or under-etching.

The problem of undercutting (or over-etching) during the process of forming openings in the oxide layer is very serious in device manufacture since it means that etching takes place in the region surrounding or adjacent the area that is to be etched away so that a greater amount of etching takes place laterally along the surface of the semiconductor or silicon material than is desired. This affects overall product yield since the deposited metal in the contact hole can extend laterally across the semiconductor surface beyond the predefined contact region thereby possibly shorting out the device (by contacting another diffused region) and making the associated circuit inoperative. The problem of under-etching is created by the failure of the etchant to etch completely through the oxide region, thereby leaving a residual amount or layer of glass or oxide material over the semiconductor surface which prevents making good electrical contact to the semiconductor surface. Both the over-etching and under-etching problems described above are taken into consideration by the semiconductor manufacturer and an attempt is made to set precise etching times and conditions to avoid either problem, but with the recognition that a balance has to be made to allow some over-etching in certain areas to prevent under-etching in other areas. This balance is very difficult to achieve especially when consideration has to be made of (a) different oxide thicknesses across the substrate surface and (b) different oxide doping concentrations at various regions across the substrate surface which create undesired etching conditions. Precise alignment control is very critical to an extreme degree in the formation of MOS or field effect type devices. Misalignment of the source and drain regions with respect to the gate region results in either the formation of inoperative devices or circuits or in inconsistent performance results.

Referring specifically to FIG. 11, step 1 of the field effect transistor device fabrication process of this invention depicts a P+ type substrate 10 which has a resistivity of, for example, about 0.05 to 0.2 ohm-centimeters and has a thickness of about 15 mils. Although, for the purpose of describing this invention, reference is made to a semiconductor structure where a P+ type substrate is utilized as the starting substrate and subsequent semiconductor regions of the opposite type conductivity are formed in the starting substrate, it is readily apparent that all the semiconductor regions referred to as being of one conductivity type can be of the opposite conductivity type, including the starting substrate, and furthermore, some of the semiconductor regions formed by diffusion operations can also be made by epitaxial growth techniques. Similarly, some of the epitaxial growth regions can also be fabricated by conventional diffusion techniques. The substrate 10 is a wafer of, preferably, monocrystalline silicon material which can be fabricated by a conventional technique such as by pulling a silicon semiconductor rod from a melt containing the desired P-type impurity concentration and then slicing the pulled rod which has an elongated bar shape configuration into a plurality of wafers. The wafers are then cut to size, lapped and chemically polished. The wafers have any desired crystallographic configuration, but are preferably slightly off the (100) axis in any direction. The P+ substrate 10 has a very low electrical resistance and hence, serves as a good conductor of the current which the P-type substrate receives during switching of the FET devices. Therefore, the external corner terminal pads 150 and 152 of FIG. 1 are connected to the P-type substrate and, by means of the conductive region around the periphery of the chip 100 connected to both of the pads 150 and 152, can rapidly draw current from the substrate due to the high conductivity of the P+ substrate 10.

In step 2 of the process, a very thin epitaxial layer 12 is deposited or grown on the substrate 10. The epitaxial layer 12 is of P-type conductivity and preferably has a resistivity of about 2 ohm-cemtimeters and a thickness of about 4 microns. This thin epitaxial layer 12 subsequently serves as the P-type substrate for the formation therein of the N-channel FET devices. The use of an epitaxial layer is advantageous because it permits a high degree of control to be achieved on the resistivity of the substrate layer that is to contain the diffused source and drain regions forming the FET devices. Some semiconductor manufacturers form their N source and drain regions in the starting substrate which is of high resistivity P-material. It is difficult to consistently obtain all starting substrates, pulled and formed from a melt, with the desired resistivity.

The thin epitaxial layer 12 also provides the advantage of permitting current passing into the P− epitaxial layer 12 in the switching of the FET device to be rapidly passed into the high conductivity P+ substrate 10 because of the thinness of the epitaxial layer 12. Furthermore, in providing the N+ protective devices 122 or diffused regions associated with the SAR terminal pads 120 as shown in FIG. 1, high voltage pulses applied to the SAR terminal pads will not break down the thin oxide gate regions electrically connected to the terminal pads because the thin epitaxial layer 12 will enable junction breakdown to occur beneath the N+ protective diffused regions before a high voltage can be applied to any of the gate regions. Hence, breakdown currents from the protective diffused regions associated with the pads can be passed rapidly through the thin epitaxial layer 12 into the P+ substrate 10.

In step 3, an insulating oxide layer 14 is preferably formed on the surface of the epitaxial layer 12 by thermal oxide growth techniques. However, other deposition techniques can be used such as pyrolitic oxide formation, evaporation or RF sputtering of oxide material. The initial silicon dioxide layer 14 has a thickness of about 6,000 A. If desired, other insulating materials than silicon oxide can be utilized such as for example, silicon nitride, aluminum nitride, aluminum oxide, etc.

After the formation of the initial thick oxide layer 14, the substrate is placed in a furnace and subjected to high temperature reoxidation (dry oxygen)-anneal (dry nitrogen) operations which are carried out at a temperature of 1,000°C for a period of about 30 minutes for each operation.

In step 4, using conventional photolithographic masking and etching techniques, openings 16 and 18 are formed in the oxide layer 14. If desired, sputter etching techniques can be utilized to form the openings 16 and 18 by using a mask and a reverse sputtering procedure.

In step 5, a phosphosilicate glass (PSG) layer 20 is deposited over the oxide layer 14 for the formation of N+ source and drain regions 22 and 24, respectively, by diffusion techniques through openings 16 and 18 in the masking oxide layer 14. The sheet resistance of the source and drain regions at this state of the process of fabricating the FET device is about 10–12 ohms per square and the $X_j$ or distance of the N+ diffused regions into the P-type epitaxial substrate region 12 is on the order of about 0.7 to 0.8 microns (before drive-in; after drive-in 1–1.1 microns). The phosphosilicate glass layer 20 has a thickness of about 1,500 A in the regions in contact with the silicon in the openings in the oxide layer 14.

In step 6, surface oxide layer 26 is shown to be substantially uniform over the entire substrate surface except for the recessed oxide regions over the source 22 and drain 24 diffused regions. These oxide recessed regions are achieved during a reoxidation step after the PSG deposition operation in Step 5 which is carried out at a temperature of about 900°C. The reoxidation step is carried out at 900°C at time periods of 10 minutes in a dry oxygen atmosphere followed by 120 minutes in a steam oxidation atmosphere followed by 5 minutes in a dry oxygen atmosphere. During the reoxidation operation, a portion of the diffused N+ layer is converted into silicon dioxide as shown in the drawing of step 6. Accordingly, the recessed oxide regions over the source 22 and drain 24 diffused regions are often thicker than the non-recessed oxide regions. This reoxidation step serves to develop a thickness of combined oxide and phosphosilicate glass over the source and drain regions that is at least the same and preferably higher than the thickness of the oxide over the remaining (P) regions of the semiconductor substrate. In some cases, it may be desirable to continue oxide growth for a period of time sufficient to create an oxide bump region rather than a recessed region. During reoxidation, the diffused N+ regions penetrate to a depth ($X_j$) of about 1 micron and this diffusion operation is described in the co-pending patent application entitled "Semiconductor Diffusion Process," inventor William A. Brown, filed concurrently herewith, and assigned to the same assignee of this application. Reference is also made to the co-pending patent application entitled "Fabrication Process for Field Effect and Bipolar Transistor Devices," inventors W. A. Brown, et al., filed concurrently herewith and assigned to the same assignee of this invention. There is an approximately 500 A difference between the thickness of the oxide (about 8,000 A) over the source and drain regions which is greater than the thickness of the oxide (about 7,500 A) over the remainder of the semiconductor substrate surface. The reoxidation step can have varying times and temperatures provided the thickness of the oxide regions over the source and drain diffusion regions is formed to an optimum level to permit simultaneous etching of the gate window and the source and drain contact holes as illustrated in step 7. By forming the thicker oxide recessed regions as shown in step 6, compensation is provided for the fact that the oxide regions over the source and drain regions contain phosphorous atoms which produces faster etching in these oxide regions.

In step 7, photolithographic masking and etching operations are used to etch out a gate window 28, source 30 and drain 32 contact hole regions. The etchant is a 7:1 buffered HF acid solution. The gate window 28 and source 30 and drain 32 contact holes for the source 22 and drain 24 regions, respectively, will open up simultaneously in approximately 5 minutes and 15 seconds. The resulting structure after etching is shown in step 7. For clarity in illustration, step 7 and the remaining steps in the process do not show the recessed oxide region that is formed in step 6 in the N+ diffused regions.

In step 8, a thin oxide of approximately 500 A thickness, which may or may not include a thin layer of phosphosilicate glass (PSG) or other passivating layer deposited on the oxide layer for stability purposes, is grown, deposited or formed on the exposed silicon surface by thermal oxide techniques. In the case where a thin phosphosilicate glass layer is desired over the thin, thermally grown gate oxide region, a suitable deposition process is carried out using a phosphorous source to form a phosphosilicate glass. Such a technique is performed using either phosphorous ($P_2O_5$) powder or a POCl 3 source and is well known in the art. Thin oxide layer 34 formed in the gate window serves as the insulated gate region.

During the formation of the thin oxide layer in step 8, the 500 A thin oxide layer is formed by first subjecting the substrate to a temperature of about 1,000°C for about 33 minutes in dry oxygen which results in a 380 A oxide layer being formed. The substrate is then heat treated in an open tube phosphorous diffusion system at 800° C for 10–20–5 minute cycle to effect a PSG deposition of about 30 A over the 380 A oxide layer. The substrate is then subjected to a heat treatment at about 1,000° C for a period of about 20 minutes in dry oxygen and about 10 minutes in dry nitrogen to obtain a stabilized and annealed 500 A thick gate oxide.

In step 9, a first blockout photoresist mask layer P1 is deposited on the oxide surface to protect the oxide surface except for the thin oxide layer located in the source and drain regions. A second blockout photoresist layer P2 is deposited on the first photoresist layer P1 (step 10). By providing both of these blockout photoresist layers P1 and P2, pinhole protection is provided by the double photoresist layer and, additionally, ease in etching out the source and drain contact openings, from a manufacturing standpoint, is permitted since the blocked out hole regions of each photoresist layer (P1, P2) need not be precisely aligned with respect to each other.

In step 10, holes are opened up through the thin oxide layer over the source 22 and drain 24 regions to expose these different regions and thereby permit electrical metal contacts to be made thereto. The structure is now ready for a metal deposition and etching operation to form both gate electrode and metal contacts to the source 22 and drain 24 regions.

In step 11, gate electrode 36, and source 38, and drain 40 electrodes are formed by depositing aluminum, for example, on the oxide layer 26 and then etching away to form the desired metal pattern. In this manner, ohmic contact is provided to the source 22 and drain 24 regions and the gate electrode 36 is provided over the thin 500 A oxide layer that is located over the channel or gate region between the source and drain regions of the N-channel FET device shown in step 10. At this point, the $X_j$ of the N+ diffused regions is approximately 1.5 microns, the sheet resistivity of the source and drain regions are approximately 6 ohms per square, and the minimum distance or separation between source and drain regions (L effective) is about 0.2 mils. The gate electrode 36 has a surface metal portion which overlaps the thin oxide layer 34. This is important in order to prevent possible contact between the thin oxide layer 34 and a subsequently deposited (step 12) encapsulating glass or quartz layer G as an encapsulant over the metallized land or pattern substrate surface. Preferably, prior to glass encapsulation, a metal annealing operation is carried out for a period of about 10 minutes at 500° C in dry nitrogen. The encapsulated quartz layer is deposited preferably by RF sputtering techniques and electrical contact to the metallized regions of the FET devices in the epitaxial layer 12 is achieved by forming terminal holes and providing terminal contacts therein as shown and described in U.S. Pat. No. 3,408,207 to Agusta, et al. Contact between the encapsulated quartz layer and the thin oxide layer is avoided by the overlapping gate electrode for general misalignment conditions and thus, the encapsulating quartz layer, which usually has some electrical charge, will not affect the charge sensitive thin oxide gate regions.

The aluminum metal deposited on the oxide layer 26 surface for forming the conductive metal land pattern preferably has a thickness of about 15,000 A. The metal is deposited using an RF coupled metal evaporation source to prevent heating more than the source material and the high purity container (such as boron nitride) that is RF heated with eddy currents by an external RF generator. The RF coupled metal evaporation technique thus has the significant advantage is minimizing contamination of the deposited metal material because it prevents outgassing or diffusion of contaminants from other heated regions which occurs in conventional resistance heating evaporation apparatus. Elimination of contaminants in the evaporation process prevents other elements from being deposited with the aluminim which would increase the electrical charge of the deposited metal. It is essential that the deposited metal layer for FET device contact and interconnections have the lowest possible electrical charge and thus not create a significant, undesired voltage on the thin oxide or gate regions. Hence, by using an RF coupled metal evaporation source, a large amount of aluminum, or any other desired metal, can be deposited and the deposited metal contains a very low electrical charge of about 0.7 volts which is close to the low theoretical charge limit that high purity aluminum displays.

The encapsulating RF sputtered quartz layer preferably has a thickness of about 3 microns and, like the above described aluminum deposition operation, is deposited using the highest purity quartz target material and the cleanest RF system that can be obtained to prevent undesired contaminants from being deposited with the sputtered quartz on the substrate surface. Contaminants in the deposited quartz material can eventually affect device stability and can also cause an undesired increase in the electrical charge of the deposited quartz layer which might provide immediate undesired electrical effects that could seriously impair device and circuit stability.

After the glass layer has been deposited by RF sputtering techniques, an annealing operation is carried out at 500° C for about 10 minutes in a dry nitrogen atmosphere.

While the above described process has been limited to a discussion of the fabrication of an insulated gate N-channel FET device, it should be readily apparent to those skilled in the semiconductor art that other types of unipolar devices can be made using the teachings of this invention. For example, P-channel FET devices as well as non-insulated gate devices can be fabricated in accordance with the principles of this invention.

The N-channel FET device shown in step 12 is turned on by applying a potential of, for example, +2 volts to the gate electrode 36, 0 or ground potential to the source electrode 38, +5 volts to the drain electrode 40, and a substrate bias potential to the P− substrate 12 of −6 volts.

While the invention has been particularly shown and described in reference to the preferred embodiments thereof, it will be understood by those skilled in the art that changes in form and details may be made therein without departing from the spirit and scope of the invention.

What is claimed is:

1. A semiconductor chip comprising a fully decoded monolithic memory system having a plurality of memory cells interconnected into a memory array; and bit decode means substantially centrally located in said chip for providing substantially the same driving signal to all memory cells located on both sides of said bit decode means.

2. A semiconductor chip in accordance with claim 1 wherein said memory cells are FET memory cells.

3. A semiconductor chip in accordance with claim 2 wherein each of said FET memory cells comprise a plurality of N-channel FET devices interconnected to provide an FET memory cell.

4. A semiconductor chip in accordance with claim 1 wherein said semiconductor chip includes a bit inverter connected to said bit decode means, word decode means supplying word drive signals to said memory cells, and a word inverter connected to said word decode means.

5. A semiconductor chip in accordance with claim 4 wherein said word decode means comprise a pair of word decode elements electrically connected to said word inverter means.

6. A semiconductor chip in accordance with claim 1 wherein a sense "0" line is connected to said bit decode means and a sense "1" line is connected to said bit decode means.

7. A semiconductor chip in accordance with claim 5 wherein a chip select line is connected to said pair of word decode elements and to said bit decode means.

8. A semiconductor chip in accordance with claim 4 wherein an enable line is connected to said word inverter and said bit inverter.

9. A semiconductor chip in accordance with claim 1 including voltage source means located on said chip and connected to each of said memory cells in a manner for supplying substantially the same voltage of said voltage source means to each of said memory cells.

10. A semiconductor chip in accordance with claim 9 wherein said voltage source means is at ground potential.

11. A semiconductor chip in accordance with claim 10 wherein said voltage source means comprises a pair of ground terminal elements located at opposite ends of said chip, each of said pair of ground terminal elements connected in a fan-out arrangement to half of said memory cells of said monolithic memory system.

12. A semiconductor chip in accordance with claim 4 including a plurality of SAR terminal elements connected to said word inverter and to said bit inverter.

13. A semiconductor chip in accordance with claim 12 including protective device means connecting each of said plurality of SAR terminal elements to said word and bit inverters for providing protection against large voltage pulses.

14. A semiconductor chip in accordance with claim 13 wherein said protective device means comprises a diffused region of one conductivity type located in a thin epitaxial region of the opposite conductivity type.

15. A semiconductor chip in accordance with claim 4 including voltage source power supply means connected to said word and bit inverters for supplying power to said word and bit inverters.

16. A semiconductor chip comprising a FET monolithic memory array having a plurality of FET memory cells interconnected into said memory array; and refresh means substantially centrally located in said chip for providing substantially the same refresh current to all of said memory cells located on both sides of said refresh means.

17. A semiconductor chip in accordance with claim 16 wherein said refresh means comprises FET refresh devices connected to a refresh terminal located on the periphery of said chip.

18. A semiconductor chip in accordance with claim 17 wherein said refresh terminal is electrically connected to the drain electrode of each of said FET refresh devices.

19. A semiconductor chip in accordance with claim 18 wherein each of said FET refresh devices and each of said FET memory cells are N-channel FET devices.

20. A semiconductor chip in accordance with claim 16 wherein said refresh means comprises a pair of FET devices having a common diffused region serving as either a source or drain region, a common gate electrode, and separate diffused regions serving as drain or source regions.

21. A semiconductor chip in accordance with claim 20 wherein each of said pair of FET devices has a "crooked" channel region underlying said common gate electrode.

22. A semiconductor chip comprising a plurality of FET circuits interconnected into an integrated circuit, each of said FET circuits comprising a plurality of interconnected FET devices, said semiconductor chip having an epitaxial layer of one conductivity type located on a semiconductor substrate, each of said FET devices having a source and a drain region of the opposite conductivity type located in said epitaxial layer of said one conductivity type, said semiconductor substrate is of the same conductivity type as said epitaxial layer.

23. A semiconductor chip in accordance with claim 22 wherein each of said plurality of FET circuits comprises a memory cell.

24. A semiconductor chip in accordance with claim 23 wherein said memory cell is a cross-coupled, four FET device cell.

25. A semiconductor chip comprising a fully decoded FET monolithic memory system having a plurality of FET memory cells interconnected into a memory array; voltage source means located on said chip and connected to each of said memory cells in a manner for supplying substantially the same voltage of said voltage source means to each of said memory cells; bit decode means substantially centrally located in said chip for providing substantially the same driving signal to all memory cells located on both sides of said bit decode means; and refresh means substantially centrally located in said chip for providing substantially the same refresh current to all of said FET memory cells located on both sides of said refresh means.

26. A semiconductor chip in accordance with claim 22 wherein said semiconductor substrate has a much lower resistance than the resistance of said epitaxial layer.

27. A semiconductor chip in accordance with claim 26 wherein said epitaxial layer is a thin layer, said thin epitaxial layer having a concentration of impurities and a thickness optimized to reduce noise disturbance in said chip.

28. A semiconductor chip in accordance with claim 27 wherein said thin epitaxial layer has a resistivity of about 2 ohm-centimeters and a thickness of about 4 microns.

29. A semiconductor chip in accordance with claim 28 wherein said thin epitaxial layer is of P type conductivity.

30. A semiconductor chip in accordance with claim 28 wherein said substrate has a resistivity in the range of from about 0.05 to about 0.2 ohm-centimeters and has a thickness of about 15 mils.

31. A semiconductor chip in accordance with claim 29 wherein said substrate is of P type conductivity and has a resistivity in the range of from about 0.05 to about 0.2 ohm-centimeters and a thickness of about 15 mils.

32. A semiconductor chip comprising a plurality of FET memory cells interconnected into a FET memory array, each of said plurality of FET memory cells comprises a plurality of N-channel FET devices interconnected to provide a memory cell, said semiconductor chip having a P type epitaxial layer, each of said N-channel FET devices having a source and a drain region located in said P-type epitaxial layer, said semiconductor chip having a P+ type substrate supporting said P-type epitaxial layer.

33. A semiconductor chip comprising a plurality of FET circuits interconnected into an integrated circuit, each of said FET circuits comprising a plurality of interconnected FET devices, said semiconductor chip having a thin epitaxial layer of one conductivity type located on a semiconductor substrate of the same type conductivity, each of said FET devices having a source and a drain region of opposite conductivity type located in said epitaxial layer of said one conductivity type.

34. A semiconductor chip in accordance with claim 33 wherein said FET circuits comprise at least one FET device having an L-effective of about 0.2 mils.

35. A semiconductor chip in accordance with claim 33 wherein said FET circuits comprise at least one FET device having a gate oxide thickness of about 500 A.

36. A semiconductor chip in accordance with claim 35 wherein a thick thermal oxide layer is located over the remainder of the chip surface.

37. A semiconductor chip in accordance with claim 36 wherein said thick oxide layer is about 8,000 A thickness.

* * * * *